2,938,880

CURED EPOXY RESIN COMPOSITION CONTAINING BORON TRIFLUORIDE COMPLEX OF A MONOETHYLAMINE AND PIPERIDINE, METHOD OF CURING SAID COMPOSITION AND GLASS FIBERS IMPREGNATED THEREWITH

William Russell Bailey, 4346 Alton Place NW., Washington, D.C.

No Drawing. Filed May 9, 1955, Ser. No. 507,162

5 Claims. (Cl. 260—37)

The present invention relates to construction materials and methods for making the same, and to thermosetting resins and curing agents for promoting the hardening thereof at elevated temperatures, as well as to methods for curing such resins. More particularly, the present invention relates to methods and compositions relating to epoxide resins.

Heretofore, the art has endeavored to provide suitable curing agents for epoxide resins, such as would promote curing at elevated temperatures within a reasonably short time period and with a minimum of gassing, bubbling or delamination. The art has also endeavored to provide curing agents which, when added to liquid epoxide resins, would not "set up" or harden at room temperatures or temperatures somewhat above room temperatures, but would remain fluid and workable in combination with the resin, and thereby have a desirably long "pot life." Moreover, the art has also sought to provide curing agents for epoxide resins which would promote bonding or wetting of the resin to glass fibers during the impregnation of glass fibers with such resins as in the case of construction materials.

It has heretofore been proposed to provide curing agents for epoxide resins, comprising such poly-substituted or poly-functional amines as metaphenylene diamine, pyridine, dimethylaminopropylamine, piperidine, diethylene triamine, diethylamine, or the like. Such curing agents have in the past been added to liquid epoxide resin prior to curing at elevated temperatures for the purpose of promoting such curing. However, it has been found in practice that such curing agents are not at all satisfactory, for a number of reasons.

In the first place, epoxide resin curing agents known heretofore have suffered from the great disadvantage that excessive quantities, usually in the neighborhood of 20% by weight of the whole, have been needed. Such lavish use of curing agents has added materially to the cost of manufacture of the cured product. Moreover, the curing agents known heretofore have suffered from the great disadvantage that they were slow-acting. If the curing temperature were maintained at a properly low level, then the curing cycle would often be more than an hour in length; whereas if the temperature were raised and the curing cycle thus shortened, boiling and gassing, and consequent delamination, would result. Still further, the curing agents heretofore known, when added to epoxide resins for processing, had only a relatively short "pot life," or period during which the mixture of resin and agent in the processing tank would be sufficiently fluid for use. Even at room temperature, mixtures of epoxide resins and the curing agents known heretofore had a workable life span or "pot life" of only a few hours at best.

Although many attempts were made to overcome the foregoing difficulties and other disadvantages, none, so far as is known, was entirely successful when carried into practice commercially on an industrial scale.

It has now been discovered that mono-substituted amine complexes of boron trifluoride may be used as curing agents for epoxide resins, and that much smaller quantities of curing agents are required, the cure cycle is substantially shortened, curing may proceed at reduced temperatures, wetting to glass fibers is greatly improved, a much stronger product is obtained, pot life is almost indefinitely extended, and, perhaps most startling of all, curing by high frequency dielectric heating is astoundingly facilitated. It has also been discovered that mixtures of mono-substituted amine complexes of boron trifluoride and poly-substituted amine complexes of boron trifluoride are even more effective in the above ways than the mono-substituted complexes alone.

Accordingly, it is an object of the present invention to provide construction materials having greatly increased strength and which will be relatively inexpensive.

Another object of the invention is to provide thermosetting resins comprising mixtures of epoxide resin and a curing agent which need be used in relatively small quantities.

The invention also contemplates the provision of thermosetting resins comprising mixtures of epoxide resin and curing agent designed to lower the curing temperature and reduce the cure cycle and lengthen the pot life of the resin.

Still another object of the invention is to provide curing agents for epoxide resins, which will promote the curing at lower temperatures and shorter cure cycles, may be used in smaller quantities than ordinary agents, will lengthen the pot life of the resins and reduce gassing, boiling or delamination during curing, and which will especially promote curing during radio-frequency induction heating.

Finally, it is an object of the present invention to provide methods for curing epoxide resins, both by heat transfer and by induction heating.

Other objects and advantages will become apparent from the following description and illustrative examples.

Broadly stated, the present invention comprises the provision of curing agents to promote the curing of epoxide resins alone or epoxide resins when used as impregnants, as for glass fibers disposed substantially parallel to each other to strengthen construction materials, and comprises mono-substituted complexes of boron trifluoride and mixtures of the same with poly-substituted complexes of boron trifluoride, in small but effective amounts by weight as compared to the weight of the resin proper, but preferably in excess of 0.5% by weight of the whole. The invention also comprises broadly methods for curing such resins, comprising the addition of the new curing agent to epoxide resins and thereafter maintaining the temperature of the resin between about 200 and 275° F. until the resin has cured, or subjecting the resin to radio-frequency induction heating until a cure is effected.

In preferred embodiments of the invention, about 4% by weight of monoethylamine complex of boron trifluoride is added to epoxide resins and the mixture held at about 247° F. for a period of about 20 minutes. Alternatively, about 4% by weight of monoethylamine complex of boron trifluoride and about 2% by weight of piperidine complex of boron trifluoride are added to epoxide resins and the mixture maintained at about 247° F. for about 15 minutes. Again alternatively, either the single curing agent or the combined curing agent mentioned above is added to epoxide resin which is then subjected to high frequency induction heating for only a few seconds.

For purposes of this application, the following definitions of terms will apply:

An "epoxide resin" is the reaction product of an epihalohydrin and a polyhydric phenol. Typical epihalohydrins are epichlorhydrin, epibromhydrin, and epiiodohydrin. The latter materials are all characterized by a three-carbon chain; however, analogs of the aforesaid epihalohydrins may also be used. Examples of the latter are beta-methyl epichlorhydrin and gammamethyl epichlorhydrin. It will be noted that epifluorhydrin and its analogs are not referred to above. Inasmuch as fluorine is rather unreactive in such epoxy compounds, the latter are not contemplated herein. In view of its availability and relatively low cost, epichlorhydrin is preferred. Polyhydric phenols used in the preparation of these epoxide compositions are typified by resorcinol; hydroquinone; bis phenols, such as bis phenol A, predominantly 4-4'-dihydroxydiphenyl dimethyl methane, with lesser quantities of the 2,2- and 4,2'-isomers present. Preferred polyhydric phenols are dihydric phenols whose mono alkali metal salts have a pH from about 7 to 11; examples of such dihydric phenols are those recited above. Particularly preferred, however, is bis phenol A.

A "mono-substituted amine" is a compound derived from ammonia by substituting one organic radical for one hydrogen only, as for example aniline, monoethylamine, monomethylamine, monopropylamine, ortho-, meta-, or paratoluidine, or the xylidines in any of their six isomeric forms.

A "poly-substituted amine" is also based on an $NH_3$ group, but in which two or three of the hydrogens have been replaced by organic radicals or by a single organic radical. Examples of poly-substituted amines within the scope of the invention and the appended claims are imidazole, piperidine, piperazine, carbimide, diaryl and dialkyl imines, and diaroyl and dialkoxy imides, as well as trimethyl amine, pyridine, and various of the cyanidines.

For the purpose of giving those skilled in the art a better understanding of the invention and a better appreciation of the advantages thereof, the following illustrative examples are given:

Example I

To illustrate the pot life of a resin and curing agent not within the scope of my invention, to a portion of epoxide resin in a liquid state, 25% by weight of a curing agent consisting of metaphenylene diamine was added and mixed. The epoxide resin was that type sold commercially by Shell Chemical Corporation as "Epon 828," an epoxide resin having a melting point of 9° C., a viscosity of 12,400 centiposes at 25° C., a specific gravity at room temperature of 1.1676, an epoxy value of 0.52 as measured by the pyridinium chloride method, a hydroxyl value of 0.08 as measured by the lithium aluminum hydride method, and an esterification value of 1.26. The mixture was allowed to stand for 4 hours at room temperature. At the end of this time, the mixture had set up to the point that it was highly viscous and utterly unusable for further working or handling. Thus, the undesirably short pot life of resins including curing agents according to the prior art, even at room temperature, was clearly demonstrated.

Example II

A second batch of the same mixture in the same proportions as in Example I was made. In this instance, however, the batch was maintained at a temperature of 120° F. At the end of half an hour, the mixture had become so viscous as to be unusable, as before. This greatly increased viscosity was in no sense a cure. Instead, it merely marked the point at which the batch became unworkable and useless, that is to say, the point at which the material became so viscous as to clog or gum any processing machinery it subsequently contacted, or to foul such machinery by virtue of its stiffness.

Example III

To a batch of liquid epoxide resin as in Example I, 4% by weight of monoethylamine complex of boron trifluoride, a curing agent or catalyst within the scope of my invention, was added and mixed. The mixture was permitted to stand for one month at room temperature; and at the end of this time, no appreciable increase in viscosity had occurred.

Example IV

The same mixture as in Example II was made; but in this instance, the temperature of the mixture was maintained at 150° F. for a period of 48 hours. At the end of this time, there was a barely noticeable increase in viscosity; but the batch was still quite useful and easily workable. Examples III and IV dramatically illustrate the increase in pot life obtained by the use of one embodiment of my invention.

Example V

To a batch of liquid epoxide resin as in Example I, 4% by weight of monoethylamine complex of boron trifluoride and 2% by weight of piperidine complex of boron trifluoride were added and mixed. The mixture was permitted to stand at room temperature for one month; and at the end of this time, no noticeable increase in viscosity had occurred.

Example VI

Another batch of the same mixture as in Example V was made up; and this time, the mixture was held at 150° F. for a period of 48 hours. At the end of this time, a very slight increase in viscosity had occurred; but the batch was still readily usable and easily workable. Examples V and VI illustrate the increased pot life obtainable by the use of another embodiment of my invention.

Example VII

As an example not within the contemplation of my invention, another batch of epoxide resin and curing agent as in Example I was mixed. The mixture was then used to impregnate a multiplicity of glass fibers closely spaced and disposed in substantial parallelism to each other. The glass fiber was in the form of unidirectional glass cloth, that is to say, cloth in which almost all of the fibers run in one direction, only an occasional cloth fiber being provided to hold the cloth together laterally. The glass fibers running in the principal direction were from 0.00020 to 0.00025 inch in diameter. The impregnated construction material was then subjected to radiant heating in an oven. The temperature of the material was maintained at about 300° F.; and a complete cure at this temperature was not effected until 35 minutes had elapsed. Not only was the cure cycle excessively long, but also the excessively high temperature required to effect a cure in this time resulted in partial delamination and poor wetting of the resin to the glass fibers. Thus, the poor results obtained with a curing agent according to the prior art was demonstrated.

Example VIII

A mixture of epoxide resin and curing agent as in Example III was made up and used to impregnate glass fiber as in Example VII. This constructional material was then subjected to radiant heating in an oven and was maintained at a temperature of about 247° F. After only 20 minutes at this temperature, the material had been completely cured. There was some gassing and delamination, and hence the wetting of the resin to the fiber was imperfect; however, the wetting was substantially better than in the case of Example VII.

Example IX

To a batch of liquid epoxide resin as in Example I, 4% by weight of piperidine complex of boron trifluoride was added and mixed. The mixture was used to impregnate glass fiber as in Example VII. The resulting constructional material was subjected to radiant heating in an oven and was maintained at a temperature of about 375° F. However, even at the end of 3 hours, no cure had been obtained.

Example X

To a batch of liquid epoxide resin as in Example I, 4% by weight of monoethylamine complex of boron trifluoride and 1% by weight of piperidine complex of boron trifluoride were added and mixed. The mixture was used to impregnate glass fiber as in Example VII; and the resulting constructional material was heated at 247° F. by radiant heating. After 15 minutes, a complete cure was effected. Moreover, there was no gassing nor delamination whatsoever. The resin had wetted perfectly to the glass fiber. This result is truly astounding, since the piperidine complex of boron trifluoride when used alone is apparently no curing agent at all, as evidenced by Example IX. A sample of the material 0.90 inch thick by 0.75 inch wide was subjected to the flexure test described in the "Federal Specification: Plastics, Organic: General Specifications, Test Methods" of the General Services Administration, L–P–406b, Method 1031.1, September 25, 1952, and failed at 75 pounds. This figure will be useful for comparison with corresponding figures in later examples.

Example XI

Example X was repeated; but this time, the piperidine complex of boron trifluoride was increased to 2% by weight. The mixture was used and treated as before and the constructional material cured in the same short time with the same good result. A sample 0.88 inch thick by 0.8125 inch wide was subjected to the test of Example X and failed at 100 pounds.

Example XII

Examples XI and X were repeated, but the piperidine complex of boron trifluoride was again increased, this time to 3% by weight. The same good results were obtained; and a test sample of the size of Example XI failed at 80 pounds.

Example XIII

Examples X, XI and XII were repeated, but the piperidine complex of boron trifluoride was increased in this instance to 4% by weight, with the same treatment and good results. A test sample 0.97 inch thick and 0.75 inch wide failed at 90 pounds.

Thus, a definite peak of strength would seem to be obtained at 2%, by comparison of Examples X through XIII.

Example XIV

As an example of a curing agent not within my invention, 12% by weight of dimethylaminopropylamine was added to the epoxide resin of Example I and the mixture used to impregnate the glass fiber of Example VII. This constructional material was then introduced between the plates of a high frequency dielectric heater, 230–460 volt, 60 cycle, 3-phase, 6.3 k.v.a. input at 90% power factor, 3 k.w. output, set at 28 megacycles. A cure was effected in 2 minutes. A sample 0.134 inches thick by 0.570 inch wide by 4.0 inches long was subjected to the Johnson shear test described in Method 1041 of the above-identified General Services Administration Specifications, and failed at 650 pounds for a value of 4,250 pounds per square inch.

Example XV

As another example of curing agent not within the scope of my invention, a mixture of epoxide resin and curing agent as in Example I was made up and treated exactly as in Example XIV. The radio-frequency heating equipment was the very same piece of equipment as in Example XIV; and the settings of the equipment were not altered in the least. A cure was effected in 4 minutes. A sample 0.140 inch thick by 0.519 inch wide by 4.0 inches long tested at 475 pounds for a value of 3,260 pounds per square inch by the same test as in Example XIV.

Example XVI

A mixture of epoxide resin and curing agent as in Example XI was made up and subjected to radio-frequency curing as in Example XIV. The equipment and setting of the equipment was exactly the same as in Examples XIV and XV. A complete cure was effected in the astoundingly short time of 20 seconds. A sample of the cured constructional material 0.118 inch thick by 0.502 inch wide by 4.0 inches long gave a reading of 875 pounds for a value of 7,400 pounds per square inch at failure by the test method of Example XIV.

From all of the above examples, it will be obvious that I have provided a curing catalyst which can be used in greatly reduced quantities as compared to the curing catalysts previously known to the art of curing epoxide resins. It will also be noted that my new and novel curing agent substantially reduced the cure cycle and gives improved wetting of the resin to glass fibers without appreciable bubbling or gassing. It should also be noted that with reduced cure cycle and with the elimination of gassing, the cumbersome and time-consuming hot pressing procedures heretofore necessary may be eliminated. Furthermore, it will be obvious that my new curing agents give extended pot life which is practically of indefinitely long duration under ordinary conditions of commercial operation.

It should particularly be noted that the reduction of cure cycle obtained with the use of my new curing agent in the case of induction heating is vastly improved proportionately to the reduction in cure cycle in the case of radiant heating or other heat transfer methods. In the case of radiant heating, the cure cycle is reduced about a half or two-thirds or so by use of my new curing agent; but in the case of induction heating, at least a six-fold reduction in cure cycle is effected. Although the scientific reason for this is not known, it may be that the nitrogen of the complex serves as a donor of electrons and the boron as an acceptor of electrons, with the fluorine blocking the transfer under ordinary conditions. Heat, and more particularly a radio-frequency field, may unblock the transfer; and this may be the catalysis mechanism.

It will of course be understood that the curing agent need not be introduced into the bath of epoxide resin in solid or liquid form, but may be blown through the bath as bubbles of gas. Similarly, when the resin is used to impregnate glass fiber, the curing agent or catalyst may be blown in gaseous form against the impregnated fiber. Hence, I do not wish to be restricted to any particular form of catalyst introduction.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A construction material comprising a multiplicity of substantially parallel glass fibers impregnated with a thermosetting resin comprising a small but effective amount of a mixture of monoethylamine complex of boron trifluoride in excess of about 0.5% by weight and piperidine complex of boron trifluoride in excess of about 0.5% by weight, to promote curing of the resin at elevated temperatures, balance essentially epoxide resin resulting from the reaction of a dihydric phenol with epichlorhydrin.

2. A thermosetting resin comprising a small but effective amount of a mixture of monoethylamine complex of boron trifluoride in excess of about 0.5% by weight and piperidine complex of boron trifluoride in excess of about 0.5% by weight, to promote curing of the resin at elevated temperatures, balance essentially epoxide resin resulting from the reaction of a dihydric phenol with epichlorhydrin.

3. A thermosetting resin comprising a mixture of about 4% by weight of monethylamine complex of boron trifluoride and about 2% by weight of piperidine complex of boron trifluoride to promote curing of the resin at elevated temperatures, balance essentially epoxide resin resulting from the reaction of a dihydric phenol with epichlorhydrin.

4. A method of curing epoxide resin resulting from the reaction of a dihydric phenol with epichlorhydrin comprising adding thereto a small but effective amount of a mixture of monoethylamine complex of boron trifluoride and piperidine complex of boron trifluoride to promote curing of the resin at elevated temperatures, and thereafter maintaining the temperature of the resin between about 200° F. and 275° F. until a desirably hard resin is produced.

5. A method of curing epoxide resin resulting from the reaction of a dihydric phenol with epichlorhydrin comprising adding thereto a small but effective amount of a mixture of monoethylamine complex of boron trifluoride and piperidine complex of boron trifluoride to promote curing of the resin at elevated temperatures, and thereafter subjecting the resin to radio-frequency induction heating until a desirably hard resin is produced.

References Cited in the file of this patent

UNITED STATES PATENTS

| 2,304,958 | Rouy | Dec. 15, 1942 |
| 2,572,407 | Talet et al. | Oct. 23, 1951 |
| 2,717,885 | Greenlee | Sept. 13, 1955 |

FOREIGN PATENTS

| 503,546 | Belgium | Sept. 26, 1952 |